(12) United States Patent
Atchetee et al.

(10) Patent No.: US 6,482,386 B2
(45) Date of Patent: Nov. 19, 2002

(54) CARBON BLACKS USEFUL IN WIRE AND CABLE COMPOUNDS

(75) Inventors: Michael J. Atchetee, Ottenburg; Marcel G. Tomme, BeverenWaas, both of (BE); Sandeep Bhatt, Danvers, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/728,706

(22) Filed: Dec. 1, 2000

(65) Prior Publication Data

US 2001/0031823 A1 Oct. 18, 2001

Related U.S. Application Data

(60) Provisional application No. 60/168,542, filed on Dec. 2, 1999.

(51) Int. Cl.$^7$ .................................................. C01D 3/00
(52) U.S. Cl. ..................... 423/449.1; 106/472; 106/476
(58) Field of Search ...................... 423/449.1; 524/495; 106/472, 476

(56) References Cited

U.S. PATENT DOCUMENTS

| | | |
|---|---|---|
| 3,671,663 A | 6/1972 | Seifert et al. |
| 3,735,025 A | 5/1973 | Ling et al. |
| 3,775,365 A | 11/1973 | Mathis et al. |
| 3,799,788 A | 3/1974 | Jordan et al. |
| 3,951,871 A | 4/1976 | Lloyd et al. |
| 3,963,647 A | 6/1976 | Straub |
| 3,973,983 A | 8/1976 | Jordan et al. |
| 4,002,595 A | 1/1977 | Adelman |
| 4,071,496 A | 1/1978 | Kraus et al. |
| 4,075,160 A | 2/1978 | Mills et al. |
| 4,150,193 A | 4/1979 | Burns, Jr. |
| 4,213,939 A | 7/1980 | Ruble |
| 4,221,772 A | 9/1980 | Eisenmenger et al. |
| 4,241,022 A | 12/1980 | Kraus et al. |
| 4,287,117 A | 9/1981 | Theysohn et al. |
| 4,288,023 A | 9/1981 | Larrison |
| 4,321,162 A | 3/1982 | Guffens et al. |
| 4,328,139 A | 5/1982 | Simons |
| 4,360,627 A | 11/1982 | Okado et al. |
| 4,384,944 A | 5/1983 | Silver et al. |
| 4,391,741 A | 7/1983 | Masamoto et al. |
| 4,398,582 A | 8/1983 | Yuto et al. |
| 4,412,938 A | 11/1983 | Kakizaki et al. |
| 4,465,616 A | 8/1984 | Nelson et al. |
| 4,500,672 A | 2/1985 | Suzuki et al. |

(List continued on next page.)

FOREIGN PATENT DOCUMENTS

| | | |
|---|---|---|
| EP | 0307205 | 3/1989 |
| EP | 0 420 271 A1 | 4/1991 |
| EP | 0420271 | 4/1991 |
| EP | 0460790 | 12/1991 |
| EP | 0531975 | 3/1993 |
| EP | 0819741 | 1/1998 |
| EP | 0839863 | 5/1998 |
| GB | 1 501 967 | 7/1974 |
| GB | 1 564 080 | 6/1977 |
| JP | 59018734 | 1/1984 |
| JP | 60088073 | 5/1985 |
| JP | 60163969 | 8/1985 |
| JP | 61002752 | 1/1986 |
| JP | 61007340 | 1/1986 |
| JP | 61040360 | 2/1986 |
| JP | 61097360 | 5/1986 |
| JP | 61101554 | 5/1986 |
| JP | 61239011 | 10/1986 |
| JP | 61283638 | 12/1986 |
| JP | 61283659 | 12/1986 |
| JP | 63165447 | 7/1988 |
| JP | 1126372 | 5/1989 |
| JP | 2103268 | 4/1990 |
| JP | 3068666 | 3/1991 |
| JP | 403068666 A | 3/1991 |
| JP | 3285215 | 12/1991 |
| JP | 4008741 | 1/1992 |
| JP | 4189848 | 7/1992 |
| JP | 4189849 | 7/1992 |
| JP | 5222246 | 8/1993 |
| JP | 6207052 | 7/1994 |
| JP | 6212025 | 8/1994 |
| JP | 6256577 | 9/1994 |
| JP | 6256578 | 9/1994 |
| JP | 6256579 | 9/1994 |

(List continued on next page.)

OTHER PUBLICATIONS

North American Technical Report S–136, Cabot Corporation, no date.
International Search Report for PCT/US00/32863 mailed Mar. 19, 2001.
Electromagnetic Compatibility Society(IEEE), Characteristics of Semiconductive Shields, WG 5–29, Nov. 24, 1996, Task Group Minutes.
Electromagnetic Compatibility Society(IEEE), Historical Improvements to Furnace Carbon Black, WG 5–29, Fall 1998, Task Group Minutes.

*Primary Examiner*—Stanley S. Silverman
*Assistant Examiner*—Edward M. Johnson

(57) ABSTRACT

Novel carbon blacks are described wherein the carbon blacks have a nitrogen surface area of from about 65 to about 95 m$^2$/g; an Iodine number without additive of from about 64 to about 120 mg/g; a tinting strength of about 90% or less; and a particle size of from about 22 nm to about 39 nm. Polymeric compositions containing at least one polymer and the carbon blacks of the present invention are further described as well as preferred polymeric compositions, such as wire and cable compounds containing the carbon blacks of the present invention in such uses as shielding compositions. Electrical conductors containing one or more layers which contain the carbon blacks of the present invention are further described as well as improved properties using the carbon blacks of the present invention.

21 Claims, No Drawings

U.S. PATENT DOCUMENTS

| | | | |
|---|---|---|---|
| 4,503,027 A | 3/1985 | Cheng | |
| 4,505,973 A | 3/1985 | Neet et al. | |
| 4,526,707 A | 7/1985 | Kutsuwa et al. | |
| 4,540,560 A | 9/1985 | Henderson et al. | |
| 4,548,980 A | 10/1985 | Nagata et al. | |
| 4,550,135 A | 10/1985 | Iwama et al. | |
| 4,557,859 A | 12/1985 | Maeda et al. | |
| 4,585,578 A | 4/1986 | Yonohara et al. | |
| 4,588,855 A | 5/1986 | Kutsuwa et al. | |
| 4,592,861 A | * 6/1986 | Bekele et al. | 252/511 |
| 4,644,988 A | 2/1987 | Ahmad et al. | |
| 4,703,079 A | 10/1987 | Ahamad et al. | |
| 4,721,740 A | 1/1988 | Takeshita et al. | |
| 4,732,927 A | 3/1988 | Ida et al. | |
| 4,784,695 A | 11/1988 | Mito et al. | |
| 4,791,016 A | 12/1988 | Schulte et al. | |
| 4,818,439 A | 4/1989 | Blackledge et al. | |
| 4,876,033 A | 10/1989 | Dziurla et al. | |
| 4,908,401 A | 3/1990 | Ohara et al. | |
| 4,915,889 A | 4/1990 | Procida et al. | |
| 4,929,280 A | * 5/1990 | Wideman et al. | 106/472 |
| 4,973,463 A | 11/1990 | Nakai | |
| 5,003,163 A | 3/1991 | Jensen | |
| 5,019,617 A | 5/1991 | Kaidoo et al. | |
| 5,059,408 A | 10/1991 | Mito | |
| 5,100,637 A | 3/1992 | Nakai | |
| 5,110,576 A | 5/1992 | Soeda et al. | |
| 5,124,396 A | 6/1992 | Branan, Jr. et al. | |
| 5,132,357 A | 7/1992 | Endter et al. | |
| 5,137,962 A | 8/1992 | Green | |
| 5,200,164 A | 4/1993 | Medalia et al. | |
| 5,206,283 A | 4/1993 | Kawakami et al. | |
| 5,212,226 A | 5/1993 | Soeda et al. | |
| 5,229,452 A | 7/1993 | Green et al. | |
| 5,230,878 A | 7/1993 | Nakai et al. | |
| 5,232,974 A | 8/1993 | Branan, Jr. et al. | |
| 5,236,992 A | 8/1993 | Bush | |
| 5,288,788 A | 2/1994 | Shieh et al. | |
| 5,320,820 A | 6/1994 | Yasuharu et al. | |
| 5,352,289 A | 10/1994 | Weaver et al. | |
| 5,382,621 A | 1/1995 | Laube | |
| 5,393,821 A | 2/1995 | Shieh et al. | |
| 5,484,836 A | 1/1996 | Kikuchi et al. | |
| 5,516,833 A | 5/1996 | Ohashi et al. | |
| 5,538,548 A | 7/1996 | Yamazaki | |
| 5,556,697 A | 9/1996 | Flenniken | |
| 5,587,110 A | 12/1996 | Yamana et al. | |
| 5,656,686 A | 8/1997 | van Laak et al. | |
| 5,688,317 A | * 11/1997 | Mackay et al. | 106/476 |
| 5,700,845 A | 12/1997 | Chung et al. | |
| 5,705,555 A | 1/1998 | Guilfoy et al. | |
| 5,725,650 A | 3/1998 | Flenniken et al. | |
| 5,728,766 A | 3/1998 | Schauder et al. | |
| 5,733,480 A | 3/1998 | Lee et al. | |
| 5,747,147 A | 5/1998 | Wartenberg et al. | |
| 5,747,559 A | 5/1998 | Whitehouse et al. | |
| 5,801,209 A | 9/1998 | Chung et al. | |
| 5,804,614 A | 9/1998 | Tanaglia | |
| 5,844,037 A | 12/1998 | Lundgard et al. | |
| 5,859,120 A | 1/1999 | Karl et al. | |
| 5,871,706 A | 2/1999 | Whitehouse | |
| 5,872,177 A | 2/1999 | Whitehouse | |
| 5,877,250 A | 3/1999 | Sant | |
| 5,929,157 A | 7/1999 | Matsuo | |
| 5,958,303 A | 9/1999 | Narkis et al. | |
| 6,086,792 A | 7/2000 | Reid et al. | |
| 6,153,684 A | 11/2000 | Shieh et al. | |
| 6,156,837 A | 12/2000 | Branan, Jr. et al. | |

FOREIGN PATENT DOCUMENTS

| | | |
|---|---|---|
| JP | 7161225 | 6/1995 |
| JP | 8003410 | 1/1996 |
| JP | 8022716 | 1/1996 |
| JP | 8127731 | 5/1996 |
| JP | 9048932 | 2/1997 |
| JP | 9058077 | 3/1997 |
| JP | 10081836 | 3/1998 |
| JP | 11016421 | 1/1999 |
| JP | 11060799 | 3/1999 |
| JP | HEI11(1999)-269403 | 10/1999 |
| JP | 02000040419 A | 2/2000 |
| WO | WO 91/13944 | 9/1991 |
| WO | WO 91/17114 | 11/1991 |
| WO | WO 92/04415 | 3/1992 |

* cited by examiner

CARBON BLACKS USEFUL IN WIRE AND CABLE COMPOUNDS

This application claims the benefit under 35 U.S.C. §119(e) of prior U.S. Provisional Application No. 60/168,542 filed Dec. 2, 1999, which is incorporated in its entirety by reference herein.

BACKGROUND OF THE INVENTION

The present invention relates to carbon blacks and further relates to their use in wire and cable compounds, such as shielding compositions. The present invention farther relates to methods of incorporating these carbon blacks into wire and cable compounds and certain properties which can be achieved using the carbon blacks of the present invention.

Insulated cable is used extensively for transmission and distribution of electrical power. Two components of the power cable contain conductive carbon black the strand shield and insulation shield. These carbon black filled semi-conductive materials are used to create an equipotential surface between the conductor and the insulation and to orientate the field in the insulation parallel to the conductor.

Carbon blacks are incorporated into the polymer composition through variety of mixing techniques. They are used extensively in the industry to render resistive polymers electrically conductive. The degree of electrical conductivity imparted by a specific carbon black is related to its physical and chemical properties. For carbon blacks with desired conductivity, it is generally desirable to utilize those carbon blacks that will provide as low viscosity as possible, and thus improve the processability of carbon black-polymer composition of the mixture. For cable applications, another important factor affecting extended cable life is smoothness at the shield interfaces. Any defect at the interfaces can increase the stress levels and may lead to premature cable failure. These defects are generally found to be caused by contaminants, degraded polymer gels, and/or poorly dispersed carbon black.

The power cables designed for medium to high voltage applications have a copper or aluminum core conductor, a layer of semi-conductive shielding, a layer of insulation, and a layer of semi-conductive insulation shielding. The insulation layer is predominantly either crosslinked polyethylene or crosslinked ethylene propylene rubber (EPR). During the installation of the cable it is often necessary to make splices and terminal connections, this requires the clean delamination of the insulation shield layer from the insulation layer. Therefore, a strippable semi-conductive insulation shielding which can be easily stripped from the insulation layer will be desirable. However, a minimum strip force is required to maintain the mechanical integrity between the insulation layer and the semi-conductive insulation; if the force is too low then loss of adhesion may result in water diffusing along the interface causing electrical breakdown.

Accordingly, it will be advantageous to produce novel carbon black that can impair at the same time higher compound conductivity at a comparatively lower viscosity and high level of smoothness and a low adhesion in strippable formulations. These and other advantages are achieved by the carbon black and polymer compositions of the present invention.

SUMMARY OF THE INVENTION

A feature of the present invention is to provide novel carbon blacks which preferably provide one or more improved properties to the wire and/or cable compounds.

The present invention also relates to polymeric compositions, such as wire and cable compounds, containing the carbon blacks of the present invention.

Another feature of the present invention is to provide carbon blacks, which when incorporated into wire and cable compounds, provide a low viscosity.

In addition, a feature of the present invention is to provide carbon blacks, which when incorporated into wire and cable compounds, lead to an acceptable and higher conductivity ranges.

A further feature of the present invention is to provide carbon blacks which when incorporated into wire and cable compounds promote a very high smoothness of the formed compound.

An additional feature of the present invention is to provide carbon blacks, which when incorporated into wire and cable compounds, promote a very good stripability of the layer containing the carbon black.

Also, a feature of the present invention is to provide carbon blacks, which when incorporated into wire and cable compounds, provides a combination of all of the above-described properties.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages and in accordance with the purpose of the present invention, as embodied and broadly described herein, the present invention relates to a conductive carbon black having a nitrogen surface area of from 65 to 95 $m^2/g$; an Iodine number without additive of from 64 to 120 mg/g; a tinting strength of about 90% or less; and a ASTM particle size of from 22 nm to 39 nm.

The present invention further relates to polymer compositions, such as cable and wire compounds, containing the above-described carbon black.

In addition, the present invention relates to a polymer composition containing the above-described carbon black, an ethylene containing polymer, and a crosslinking agent. This polymer composition can further contain an acrylonitrile butadiene type polymer and/or other conventional additives.

Furthermore, the above-described carbon black can be further treated with a variety of one or more treating agents such as a polymer comprising an acrylonitrile and at least one other monomer; ethoxylated esters or polyethers; compounds containing at least one long chain alkenyl or alkyl group and at least one amine group; alkylene type compounds such as polyethylene glycol, and the like.

In addition, the present invention relates to methods to lower viscosity, improve conductivity, improve smoothness, and/or improve stripability of the wire and cable compound using the carbon blacks of the present invention.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to novel carbon blacks and their use in polymeric compositions such as wire and cable compounds. Preferably, the use of the carbon blacks in the wire and cable compounds leads to improved properties such as one or more of the following: a lowered viscosity of the wire and cable compounds; an improved conductivity range; an improved smoothness of the formed wire and/or cable compound; and/or an improved stripability of the formed wire and/or cable compound.

The carbon black of the present invention preferably has a nitrogen surface area of from about 65 to about 95 m$^2$/g as measured by ASTM D4820. The carbon black further has an Iodine number without additive of from about 64 to 120 mg/g as measured by ASTM D1510. The carbon black further has a tinting strength of 90% or less as measured by ASTM D3265; and a ASTM particle size of from about 22 nm to about 39 nm as measured by ASTM D3849-89.

The carbon black of the present invention can further have one or more of the following additional characteristics which are preferred: a DBPA of from about 119 to about 128 cc/100 g as measured by ASTM D2414 and preferably a DBPA of from about 120 to about 124 cc/100 g and even more preferably 123 cc/100 g.

Preferably, the carbon blacks of the present invention have a nitrogen surface area of from about 65 to about 75 m$^2$/g, more preferably 66 m$^2$/g to 75 m$^2$/g, and even more preferably 68 m$^2$/g to 72 m$^2$/g, and most preferably 70 m$^2$/g; an Iodine number without additive of from 78 to 85 mg/g and more preferably 80 to 85 mg/g, and even more preferably 83 mg/g; a tinting strength of from about 75% to about 90% and more preferably about 81%; an ASTM particle size of from about 30 to about 38 nm, and even more preferably about 34 nm. Other ranges of characteristics include, but are not limited to, a nitrogen surface area of from 65 m$^2$/g to 72 m$^2$/g, such as 68 m$^2$/g; a DBPA range of from 120 to 127 cc/100 g, such as 123 cc/100 g; an Iodine number of from 80 to 90 mg/g; a tinting strength of from 75 to 85%, such as 80%. The present invention can use carbon blacks having these characteristics or use carbon blacks outside of these characteristics but still within the broader defined characteristics as set forth earlier. Also, the carbon blacks can be used as strippable conductive wire or cable compounds as described below or can be used in other types of articles as described throughout the present application.

The carbon blacks of the present invention can be made using the furnace as described in U.S. Pat. No. 5,877,250, which is incorporated herein in its entirety by reference. Preferably, in following the process described in U.S. Pat. No. 5,877,250, the primary combustion level is less than 600%, preferably less than 400%, and more preferably from about 180 to about 320%. Preferably, the overall combustion level of the process is about 30% or less, preferably from about 20% to about 30%, more preferably from about 24% to about 27%. It is also preferred that the residence time for the carbon black forming reactions in the process for producing the carbon blacks of the present invention is 0.55 seconds to 9.99 seconds, more preferably from about 1.3 seconds to about 6.58 seconds. With respect to the ratio of air to natural gas, this ratio is at least 30:1, preferably is less than 60:1, and more preferably is less than 40:1 and even more preferably is from about 18:1 to about 32:1. In referring to the furnace described in U.S. Pat. No. 5,877,250, the feedstock may be introduced either through a probe 15 or radially inward through a plurality of openings positioned in the wall of zone 12 at point 32 or a combination of the two. The feedstock introduced through the probe 15 can be altered by changing the number of injection openings. The angle of the openings can vary from a direction axially with the reaction centerline or radially up to and including perpendicularly to the reactor centerline. In addition, the position of the probe may be altered along the centerline of the reactor from position 32.

Finally, the feedstock sulfur amount is preferably less than 1000 ppms, though higher amounts can be used. Generally, with the above-described preferred parameters in following the process described in U.S. Pat. No. 5,877,250, carbon blacks having the above-described properties of the present invention can be made. Further alterations to the process can be made by those skilled in the art in view of the present description once the desired parameters, as described above, are used as objectives in running the furnace to form the carbon blacks.

Preferably, the carbon blacks which are formed are furnace carbon blacks, however other carbon blacks can be made, such as channel blacks or acetylene blacks. The carbon blacks of the present invention can be in fluffy form or pelletized form and the pellets can be formed using conventional techniques which are known to those skilled in the art.

The carbon blacks of the present invention can be further treated with a variety of treating agents, such as binders and/or surfactants. The treating agents described in U.S. Pat. Nos. 5,725,650; 5,200,164; 5,872,177; 5,871,706; and 5,747,559, all incorporated herein in their entirety by reference, can be used in treating the carbon blacks of the present invention. Other preferred treating agents, including surfactants and/or binders, can be used and include, but are not limited to, polyethylene glycol; alkylene oxides such as propylene oxides and/or ethylene oxides, sodium lignosulfate; acetates such as ethyl-vinyl acetates; sorbitan monooleate and ethylene oxide; ethylene/styrene/butvlacrylates/methyl methacrylate binders; copolymers of butadiene and acrylonitrile; and the like. Such binders are commnercially available from such manufactures as Union Carbide, ICI, Union Pacific, Wacker/Air Products, Interpolymer Corporation, and B.F. Goodrich. These binders are preferably sold under the trade names: Vinnapas LL462, Vinnapas LL870, Vinnapas EAF650, Tween 80, Syntran 1930, Hycar 1561, Hycar 1562, Hycar 1571, Hycar 1572, PEG 1000, PEG 3350, PEG 8000, PEG 20000, PEG 35000, Synperonic PE/F38, Synperonic PE/F108, Synperonic PE/F127, and Lignosite-458.

Generally the amount of treating agent used with the carbon blacks of the present invention can be the amounts recited in the above-described patents, for instance in an amount of from about 0.1% to about 50% by weight of the treated carbon black, though other amounts can be used depending upon the type of properties desired and the particular treating agent(s) being used.

With respect to the polymer compositions, the carbon blacks of the present invention can be incorporated into any polymeric composition containing one or more polymers and optionally other conventional additives. The carbon blacks of the present invention can be used in elastomeric and rubber compositions. Preferably, the composition is an ethylene containing polymer or elastomer, such as, but not limited to, polyethylene or an ethylene copolymers, ethylene-propylene rubber, ethylene-vinyl acetate (EVA), and/or ethylene ethyl acrylate (EEA). Therefore, articles of manufacture containing the carbon blacks of the present invention can be made. A preferred article of manufacture is an extruded article, such as a profile, tube, tape, or film. Another preferred article is a strippable conductive wire or cable coating compound. Also preferred as an article of manufacture of the present invention is a medium or high voltage cable comprising:

A metal conductor core;

A semi-conductive shield;

An insulation layer; and

An outer semi-conductive layer.

The carbon blacks of the present invention can be present in a shielding composition and/or outer semi-conductive layer. These compositions are known as strand shielding compositions and insulation compositions.

The novel carbon blacks of the present invention can be incorporated into conventional polymer compositions using conventional amounts. For instance, the carbon blacks of the present invention can be incorporated into shielding compositions in conventional amounts such as from about 1% to about 50% by weight of the shielding composition, and more preferably from about 15% to about 45% based on the weight of the shielding composition, and most preferably from about 30% to about 40% by weight of the shielding composition.

Preferably, the shielding compositions of the present invention contain an ethylene containing polymer or polyethylene such as an ethylene-vinyl acetate copolymer and a crosslinking agent such as an organic peroxide crosslinking agent. The shielding compositions of the present invention can further contain other polymers such as an acrylonitrile butadiene polymer (e.g., an acrylonitrile butadiene copolymer). If the carbon black has a treating agent on it, such as in the form of an acrylonitrile butadiene copolymer, then the amount of acrylonitrile butadiene polymer or other polymer(s) that may be present can be reduced or eliminated in the shielding composition.

Preferably, the ethylene containing polymer is an ethylene-vinyl acetate copolymer or EEA which is preferably present in an amount of from 20 to about 50% by weight based on the weight of the shielding composition and more preferably, from about 25 to about 45 weight %.

The carbon blacks of the present invention can be substituted for the conventional carbon blacks described in European Patent Application No. 0 420 271; U.S. Pat. Nos. 5,747,559; 5,871,706; 5,872,177; and 5,725,650, all of which are incorporated herein in their entirety by reference.

Typically, the semi-conductive compositions may be made by combining one or more polymers with an amount of carbon blacks sufficient to render the composition semi-conductive. Similarly, the insulating materials may be formed by incorporating minor amounts of carbon black, for example, as a colorant, into a polymer composition. Insulating material may be formed by combining a polymer and an amount of carbon black much less than that sufficient to impart semi-conductive properties to the material. For example, the polymeric compositions of the present invention may be made by combining a polymer, such as a polyolefin, with an amount of carbon black sufficient to render the composition semi-conductive.

The compositions of the present invention may also include suitable additives for their known purposes and known and effective amounts. For example, the compositions of the present invention may also include such additives as cross-linking agents, vulcanizing agents, stabilizers, pigments, dyes, colorants, metal deactivators, oil extenders, lubricants, inorganic fillers, and the like.

The polymeric compositions of the present invention can be made using conventional techniques such as mixing the various components together using commercially available mixers. The compositions can then be formed into the desired thickness and length and width using conventional techniques known to those skilled in the art, such as described in EP 0420271;U.S. Pat. Nos. 4,412,938; 4,288, 023; and 4,150,193 all incorporated herein in their entirety by reference. In more detail, the polymer compositions of the present invention may be manufactured using conventional machinery and methods to produce the desired final polymer product. The composition may be prepared by batch or continuous mixing processes such as those well known in the art. For example, equipment such as Banbury mixers, Buss co-kneaders, and twin screw extruders may be used to mix the ingredients of the formulations. For instance, the components of the polymer compositions of the present invention may be mixed and formed into pellets for future use in manufacturing such materials as insulated electrical conductors.

The polymer compositions of the present invention may be incorporated into any product where the properties of the polymer compositions are suitable. For example, the polymer compositions are particularly useful for making insulated electrical conductors, such as electrical wires and power cables. Depending on the conductivity of the polymer compositions, the polymer composition may be used, for example, as a semi-conductive material or as an insulating material in such wires and cables. More preferably, a semi-conductive shield of the polymer composition may be formed directly over the inner electrical conductor as a conductor shield, or over an insulating material as a bonded or strippable insulation shield, or as an outer jacketing material. The carbon blacks in the selected polymer compositions may also be used in strand filling applications in either conductive of nonconductive formulations.

Typically, the components of an electric cable are a conductive core (such as a multiplicity of conductive wires) surrounded by several protective layers. Additionally, the conductive core may contain a strand filler with conductive wires, such as a water blocking compound. The protective layers include a jacket layer, an insulating layer, and a semi-conductive shield. In a cable, typically conductive wires will be surrounded by a semi-conductor shield which in turn is surrounded by an insulation layer which in turn is surrounded by a semi-conductor shield and then a metallic tape shield, and finally, the jacket layer.

The carbon blacks of the present invention preferably provide a balance of beneficial properties to polymeric compositions, such as wire and cable compounds. Preferably, the carbon blacks of the present invention, when present in wire and cable compounds provide good viscosity, high smoothness, acceptable conductivity, and good stripability. It is unusual for one type of carbon black to provide two of these properties and yet the present invention has the ability to provide at least two, three, or most preferably, all four properties.

As stated earlier, the carbon blacks, when incorporated into wire and cable compounds, have the ability to provide or promote a lower viscosity which improves the ability to disperse the carbon black throughout the polymeric composition. The carbon blacks of the present invention also preferably improve the conductivity range of the shielding composition such that volume resistivity is about 120 $\Omega$.cm or less, per ISO 3915 at 35% by weight loading in EEA, and more preferably is about 50 $\Omega$.cm or less, and even more preferably about 30 $\Omega$.cm or less. In addition, the carbon blacks of the present invention promote a high smoothness of the formed shielding composition such that the number of defects per $dm^2$ is about 7000 or less, more preferably about 3000 or less at a 35% by weight loading in EEA. The carbon blacks of the present invention when incorporated into wire and cable compounds promote a good stripability of the shielding layer, such that strip force is about 20 lb/0.5 in. or less, and more preferably about 15 lb/0.5in. or less at 36 weight % loading of carbon black in EVA. With respect to viscosity, the viscosity is preferably about 2600 cps or less and more preferably is about 2000 cps or less at a 35 weight % loading of carbon black in EEA at 190° C at a shear rate of 100/s. All of these above properties are shown for exemplary purposes only and other ranges are obtainable.

The present invention will be further clarified by the following examples, which are intended to be purely exemplary of the present invention.

EXAMPLES

Mixing of the compounds was carried out on the PR46 Buss Kneader. The polymer used for the evaluation of conductivity, viscosity, and smoothness was an EEA copolymer routinely used in the industry for the production of strand shield compounds. Before mixing, all carbon blacks were gently homogenized in 120 liter drums (by rolling the drums on the floor). The carbon black was fed by the two entries of the mixer, the feeding ratio between first and second entry kept constant at 0.9. The temperature of the extruder was kept around 180° C. and 200° C. on the die. The extruder was operated at the speed of 16 rpm. For evaluation of the strippability, a compound based on a 40% EVA copolymer was used. These compounds were made on a Banbury internal mixer.

The four point measurement method described in ISO 3915 was chosen to measure volume resistivity since it is a widely accepted international standard describing the determination of volume resistivity in conductive plastic materials. Its major advantage lies in the fact that it totally prevents any influence of the contact resistance between the sample and the measurement circuit on the reading. The material is compression molded at 180° C. in one step in a Fontijne press equipped with a microprocessor. The dimensions of the plaque are 200×200×3 mm. The molding cycle takes 17:00 minutes. The material is first heated at 180° C. during 10 minutes then cooled down to 50° C. Six specimens of 10 mm×50 mm×3 mm were prepared and tested as per the procedure.

Viscosity measurements were performed on a Göttfert 2002 rheometer, equipped with a 30×1 mm capillary die at 190° C. at different shear rates. This was done by extruding the product through a capillary die by means of a speed controlled piston and recording the melt pressure. The viscosity is the ratio between the shear stress and the shear rate. These dimensions are calculated from the piston speed and the melt pressure. Table 3 sets forth the viscosity results in pascals obtained at apparent shear rates of 100 and 1000 s-1 at given temperatures.

The tape surface smoothness was measured by means of image analysis. The tapes were extruded, using a 19 mm, 20 L/D Brabender extruder, with three heating zones (barrel and die). The temperature settings were 130, 140 and 150° C., the extrusion speed was 15 rpm. A 50×0.5 mm flat die was used and the tape was stretched to obtain a thickness of 0.25 mm. A video camera, positioned above the slowly moving tape, was used to collect images that were read into an image analysis system. After enhancement and processing of the images, the system identified, counted and sized the surface defects. The results in these size classes are presented in Table 4 as the number of defects per dm$^2$.

The ship force on the blacks were measured using the standard strip test procedure used in Cabot Corporation. Insulation shield compound was prepared by mixing blacks with EVA in Kobelco mixer, while HDPE was used as insulation layer. Individual plaques of both the insulation layer and insulation shield materials were prepared by compression molding the pelleted materials at 250° F. (121° C.); this temperature allowed smooth plaques to be formed without activation of the organic peroxide. The two layers were then laminated at 250° F. (121° C.) for 5 minutes to allow prewetting and then cured at 356° F. (180° C.) for 15 minutes. The dimensions of the final plaque are 4"×12" (100 mn×300 mm). The insulation layer has a thickness of 0.039" (1 mm) and the insulation shield has a thickness of 0.079" (2 mm). Six strips of 0.5"×12" (12.5 in×300 mm)were cut in the semi-conductive layer, the insulation layer is not cut thus maintaining a more rigid strip substrate. The strips were debonded from the plaque by using an mass peel tester. The force in pounds necessary to peel or strip the semi-conductive EVA layer from the polyethylene insulation at an angle of 180° was recorded.

The semi-conductive compositions containing the following carbon blacks were prepared. The amount of all the ingredients based on weight percent is given in Table 1B.

TABLE 1A

| Property | Test Procedure | | Black A | Black B | Black C |
|---|---|---|---|---|---|
| Iodine number* | ASTM D1510 | (mg/g) | 44 | 170 | 83 |
| Nitrogen surface area | ASTM D4820 | (m$^2$/g) | 40 | 147 | 70 |
| DBPA | ASTM D2414 | (cc/100 g) | 123 | 117 | 123 |
| Tint | ASTM D3265 | % | 56 | 92 | 81 |
| ASTM particle size | ASTM D3849-89 | (nm) | 42 | 17 | 34 |

*Measured on blacks without any additive
Black A: Elftex 280 - N550 type
Black B: Vulcan ® PA 90 - P type
Black C: Present Invention

TABLE 1B

| Composition | | Example 1 | Example 2 | Example 3 | Example 4 | Example 5 | Example 6 |
|---|---|---|---|---|---|---|---|
| Black Type | | A | A | B | B | C | C |
| Carbon black | wt % | 35 | 38 | 35 | 38 | 35 | 38 |
| EEA | wt % | 64.5 | 61.5 | 64.5 | 61.5 | 64.5 | 61.5 |
| Stabilizer | wt % | 0.5 | 0.5 | 0.5 | 0.5 | 0.5 | 0.5 |

As shown in Table 2, the lower volume resistivity of the Black C as compared to Black A shows an advantage for use in cable compounds. If manufacturers have a targeted volume resistivity as the criteria, lower loading of the new black can provide them with the desired conductivity compared to the widely used blacks (like Black A) for this application. As shown in Table 2, even at 35% (example 5) loading Black C has better conductivity as compared to Black A at 38% (example 2) loading. Black C has lower or equivalent conductivity as Black B as shown in the table below.

TABLE 2

| Composition | | Example 1 | Example 2 | Example 3 | Example 4 | Example 5 | Example 6 |
|---|---|---|---|---|---|---|---|
| Black Type | | A | A | B | B | C | C |
| Carbon black | wt % | 35 | 38 | 35 | 38 | 35 | 38 |
| Volume Resistivity* | $\Omega \cdot cm$ | 32.7 | 14.7 | 9.3 | 6.1 | 9.9 | 3.7 |

*As per ISO 3915

The lower viscosity improves the processability of the mixtures of the carbon black and molten polymer, and therefore is a particularly important and useful property of such compositions. As shown in Table 3, at equivalent conductivity the novel Black C can be used at a lower loading as compared to widely used blacks of lower surface area like Black A. The lower loading of carbon black can lead to further reductions in the compound viscosity. Therefore, manufacturers of the compounds can increase the throughput on their existing manufacturing lines and thus get substantial reduction in the manufacturing costs of the materials. Black C has slightly higher viscosity as compared to Black B

TABLE 3

| Composition | | | Example 1 | Example 2 | Example 3 | Example 4 | Example 5 | Example 6 |
|---|---|---|---|---|---|---|---|---|
| Black Type | | | A | A | B | B | C | C |
| Carbon black | wt % | | 35 | 38 | 35 | 38 | 35 | 38 |
| Viscosity of Compound at 190C in EEA at the Apparent Shear rate of | | 100/s | 1013 | 1235 | 1102 | 1333 | 1268 | 1609 |
| | | 1000/s | 218 | 248 | 233 | 270 | 282 | 336 |

Table 4 shows the data on tape surface smoothness using image analysis. The number of defects have been classified into two categories, i.e., 50-200 $\mu$m and greater than 200 $\mu$m defects. The novel Black C clearly showed the better surface smoothness as compared to the more conventional Black A and Black B used currently in the cable applications.

TABLE 4

| Composition | | | Example 1 | Example 2 | Example 3 | Example 4 | Example 5 | Example 6 |
|---|---|---|---|---|---|---|---|---|
| Black Type | | | A | A | B | B | C | C |
| Carbon black | wt % | | 35 | 38 | 35 | 38 | 35 | 38 |
| Defects/dm² | 50–200 $\mu$m | | 5653 | 3077 | 1039 | 472 | 273 | 10 |
| | >200 $\mu$m | | 2 | 1 | 12 | 11 | 1 | 0 |

Table 5 shows the strip force measured on the laminates as per the standard procedure described above. The results show that compound made with Black C has slightly higher strip force compared to Black A at equal loading, but has significantly lower strip force compared to Black B. This lower strip force imparted to compounds made with Black C, makes it a very desirable carbon black for insulation shield compounds.

TABLE 5

| | | Example 1 | Example 2 | Example 3 | Example 4 |
|---|---|---|---|---|---|
| Black Type | | A | B | C | C |
| Carbon black | wt % | 38 | 36 | 38 | 36 |
| EVA* | wt % | 60.5 | 62.5 | 60.5 | 62.5 |

TABLE 5-continued

|  |  | Example 1 | Example 2 | Example 3 | Example 4 |
|---|---|---|---|---|---|
| Dicumyl Peroxide | wt % | 1 | 1 | 1 | 1 |
| Stabilizer | wt % | 0.5 | 0.5 | 0.5 | 0.5 |
| Peel Force | lb/0.5 in | 7.2 | 16.2 | 8.6 | 10.1 |

*Polyethylene vinyl acetate

Other embodiments of the present invention will be apparent to those skilled in the art from consideration of the specification and practice of the present invention disclosed herein. It is intended that the specification and examples be considered as exemplary only with a true scope and spirit of the present invention being indicated by the following claims and equivalents thereof.

What is claimed is:

1. A conductive carbon black having a nitrogen surface area of from about 65 to about 95 $m^2/g$;
   an Iodine number without additive of from 64 to 120 mg/g;
   a tinting strength of about 90% or less; and
   an ASTM particle size of from about 22 to about 39 nm.

2. The carbon black of claim 1, wherein said carbon black has a DBPA of from about 119 to about 128 cc/100 g.

3. The carbon black of claim 1, wherein said nitrogen surface area is from about 65 to about 75 $m^2/g$.

4. The carbon black of claim 1, wherein said Iodine number without additive is from about 78 to about 85 mg/g.

5. The carbon black of claim 1, wherein said tinting strength is from about 75% to about 90%.

6. The carbon black of claim 1, wherein said particle size is from about 30 to about 38 nm.

7. The carbon black of claim 1, wherein said nitrogen surface area is from about 65 to about 75 $m^2/g$, said Iodine number without additive is from about 78 to about 85 mg/g, said tinting strength is from about 75% to about 90%, and said particle size is from about 30 to about 38 nm.

8. The carbon black of claim 1, wherein said carbon black has a nitrogen surface area of about 70 $m^2/g$; an Iodine number without additive of about 83 mg/g; a tinting strength of about 81%; and an ASTM particle size of about 34 nm.

9. A polymeric composition comprising at least one polymer and the carbon black of claim 1.

10. The polymeric composition of claim 9, wherein said polymer comprises at least one rubber or elastomer.

11. A polymer composition comprising an ethylene containing polymer, the carbon black of claim 1, at least one crosslinking agent.

12. The polymer composition of claim 11, wherein the ethylene containing polymer comprises an ethylene vinyl acetate polymer, an ethylene propylene rubber, an ethylene propylenediene monomer, or mixtures thereof.

13. The polymer composition of claim 11, further comprising at least one acrylonitrile butadiene or derivative thereof.

14. An article of manufacture comprising the polymer composition of claim 11.

15. An electrical conductor comprising a semi-conductive layer, wherein said semi-conductive layer comprises the polymer composition of claim 11.

16. A semi-conductive insulation shielding composition comprising the carbon black of claim 1, at least one ethylene-vinyl acetate copolymer; at least one acrylonitrile butadiene copolymer; and at least one crosslinking agent.

17. The carbon black of claim 1, wherein said carbon black is a treated carbon black.

18. The carbon black of claim 1, wherein said nitrogen surface area is from 68 $m^2/g$ to 72 $m^2/g$.

19. A polymeric composition comprising at least one polymer and the carbon black of claim 18.

20. The carbon black of claim 1, wherein said nitrogen surface area is from 66 $m^2/g$ to about 95 $m^2/g$.

21. A polymeric composition comprising at least one polymer and the carbon black of claim 20.

* * * * *